US012018233B2

(12) United States Patent
Chandarana et al.

(10) Patent No.: US 12,018,233 B2
(45) Date of Patent: Jun. 25, 2024

(54) WET WIPES WITH A COMBINATION OF GLYCINES FOR IMPROVED PRESERVATIVE PROPERTIES

(71) Applicant: Rockline Industries, Inc., Sheboygan, WI (US)

(72) Inventors: Ravi Chandarana, Birstall (GB); Douglas B. Cole, Belgium, WI (US)

(73) Assignee: Rockline Industries, Inc., Sheboygan, WI (US)

( * ) Notice: Subject to any disclaimer, the term of this patent is extended or adjusted under 35 U.S.C. 154(b) by 319 days.

(21) Appl. No.: 17/335,537

(22) Filed: Jun. 1, 2021

(65) Prior Publication Data

US 2022/0380703 A1 Dec. 1, 2022

(51) Int. Cl.

| | |
|---|---|
| ***C11D 7/50*** | (2006.01) |
| ***C11D 3/20*** | (2006.01) |
| ***C11D 3/32*** | (2006.01) |
| ***C11D 3/36*** | (2006.01) |
| ***C11D 17/04*** | (2006.01) |

(52) U.S. Cl.

CPC .............. *C11D 3/32* (2013.01); *C11D 3/2044* (2013.01); *C11D 3/2082* (2013.01); *C11D 3/2093* (2013.01); *C11D 3/364* (2013.01); *C11D 17/049* (2013.01)

(58) Field of Classification Search

CPC ... C11D 17/049; C11D 17/041; C11D 3/2041; C11D 3/2044; C11D 3/364; C11D 3/32; C11D 3/2082; C11D 3/2093

See application file for complete search history.

(56) References Cited

U.S. PATENT DOCUMENTS

| | | | | |
|---|---|---|---|---|
| 2004/0096528 A1* | 5/2004 | Miser | A61K 8/9789 424/773 |
| 2004/0110650 A1* | 6/2004 | Siddiqui | A61K 8/9794 510/119 |
| 2005/0002974 A1* | 1/2005 | Filbry | A61Q 19/00 424/401 |
| 2006/0116355 A1 | 6/2006 | Van Breen | |
| 2011/0224170 A1* | 9/2011 | Wagner | C07D 493/04 514/456 |
| 2014/0335029 A1* | 11/2014 | Rudolph | A61Q 15/00 560/126 |
| 2017/0042779 A1* | 2/2017 | Lou | A61Q 19/005 |
| 2017/0204351 A1 | 7/2017 | Sharif et al. | |
| 2018/0193243 A1 | 7/2018 | Koshti et al. | |
| 2021/0093724 A1* | 4/2021 | LaRosa | A61K 31/05 |
| 2022/0362119 A1* | 11/2022 | Meyer | A61K 8/24 |

FOREIGN PATENT DOCUMENTS

| | | |
|---|---|---|
| KR | 20120038585 A | 4/2012 |
| WO | 00/57843 A2 | 10/2000 |
| WO | 02/085324 A2 | 10/2002 |
| WO | 2004010958 A2 | 2/2004 |

OTHER PUBLICATIONS

European Search Report dated Jun. 22, 2022; Application No. GB2114631.1—(2) pages.

* cited by examiner

*Primary Examiner* — Charles I Boyer

(74) *Attorney, Agent, or Firm* — Boyle Fredrickson S.C.

(57) ABSTRACT

A cleaning composition including a preservative formulation having a glycine, a diol and a phospholipid complex is disclosed. The cleaning composition can be loaded on a cleaning wipe and used for personal care. The glycine and diol provide a preservative booster to the preservative system for the cleaning composition containing a phospholipid complex, such as cocamidopropyl PG-dimonium chloride phosphate, which has some limited independent preservation activity, depending on the level in the final formulation.

7 Claims, No Drawings

WET WIPES WITH A COMBINATION OF GLYCINES FOR IMPROVED PRESERVATIVE PROPERTIES

FIELD OF THE INVENTION

The present invention relates to a cleaning composition comprising one or more glycines, an alcohol and a phospholipid complex.

BACKGROUND OF THE INVENTION

Increasing number of consumers are seeking cleaning products that not only are more natural or sustainable, but which also exhibit better overall safety of use. Consumers prefer products that can be readily used around children and pets in convenient forms such as pre-loaded disposable wipes or ready to use sprays, but these safer and more sustainable products still are expected to deliver performance on many attributes, such as cleaning and reduction of germs, at parity to traditional products.

In particular, wet wipes, or cleaning wipes, have gained wide public acceptance in the area of infant care products. Infant care wipes commonly include mild cleaning solutions, while facial wipes can include emulsions (i.e. water-in-oil or oil-in-water). Cleaning wipes can also include waxes and polish to clean furniture and/or other metal, plastic and/or wood surfaces. Wet wipes can further include soaps and/or detergents to clean an individual's hands, countertops, floors, appliances, and/or the like. An additional ingredient is ammonia for cleaning glass surfaces. Short chain alcohols and various other biocides can also be included on cleaning wipes to disinfect or sanitize a variety of surfaces.

Traditional wet wipe preservation systems used in personal care applications continue to present challenges to effectively control microbial growth, which is inherent and part of the natural bioburden that occurs in raw materials and during manufacturing, storage and consumer use. Many preservative ingredients and compositions found in wet wipes have been used for many years but do not provide sufficient antimicrobial properties required for current commercial products. In addition, many of the prior art preservative ingredients and compounds are no longer regulatory compliant, fail to work effectively and/or are not acceptable to consumers.

In view of the present state of the art of cleaning compositions for wet wipes, there is a need for an improved preservative composition for inclusion within a wet wipe cleaning formulation that can be used in a variety of applications related to personal care, surface cleaning, antibacterial, disinfects, sanitizers, and/or surfaces without the deficiencies presented above.

SUMMARY OF THE INVENTION

In light of the foregoing, in one exemplary embodiment the invention is directed to an effective self-preservation system or broad-spectrum antimicrobial enhancement activity or preservative composition for use in conjunction with cleaning compositions applied to and/or impregnated within wet wipes. The self-preservation system or broad-spectrum antimicrobial enhancement activity/preservative composition is a formulation that comprises one or more ingredients heretofore not recognized for having microorganism inhibiting/preservative/antimicrobial properties, including one or more glycines in combination with one or more dials and a phospholipid. Examples of such phospholipids include alkyl PG-dimonium chloride phosphates, including those with a fatty acid chain length between 8 and 20 carbons, including but not limited to cocamidopropyl PG-dimonium chloride phosphate. Self-preservation is achieved by combining previously unknown preservative-functional ingredients that collectively produce an environment that is unfavorable for the growth of microorganisms in a synergistic manner that provides unexpected results in view of the ability of the individual components to inhibit microorganism growth in an environmentally-friendly manner.

According to another exemplary embodiment of the invention, other components are optionally present in a cleaning composition including the preservative formulation, such as, for example, water, surfactants, emollients, solvents, skin conditioning agents, humectants, fragrances, botanical extracts, oils, silicones and the like, and combinations of the same. All components of the formulation are blended together to form a wet wipe composition, solution or emulsion that can be impregnated within or otherwise applied to a nonwoven, cloth or paper substrate, or combinations of the same to form a usable wet wipe that is sufficiently preserved for storage and consumer use.

According to one aspect of an exemplary embodiment of the invention, a method of cleaning a surface includes the steps of providing a cleaning composition having a preservative composition including at least one glycine, a diol and an organic phospholipid and applying the cleaning composition to surface.

According to still another aspect of an exemplary embodiment off the invention, a cleaning wipe includes a substrate and a cleaning composition loaded onto the substrate, the cleaning composition formed of preservative composition having at least one glycine, a diol and an alkyl PG-dimonium chloride phosphate.

According to still a further aspect of an exemplary embodiment of the invention, a cleaning composition includes a preservative composition having at least one glycine, a diol and an organic phospholipid for use as a preservative and/or antimicrobial component of the cleaning composition.

Without limitation then, in other exemplary embodiments this invention is also a wet wipe, or cleaning wipe, comprising a formulation comprising at least one layer of a nonwoven material, and a cleaning composition with a preservative component comprising at least one glycine, one or more alcohols, such as one or more diols, and an alkyl PG-dimonium chloride phosphate with a fatty acid chain length between 8 and 20 carbons. In one aspect, other components are optionally present in the cleaning composition, such as, for example, water, surfactants, emollients, solvents, skin conditioning agents, humectants, fragrances, botanical extracts, oils, silicones and the like, and combinations of the same.

Other features, benefits and advantages of the present invention will be apparent from this summary and its descriptions of certain embodiments of such formulations and compositions, and will be readily apparent to those skilled in the art having knowledge of the synthetic techniques described therewith. Such features, benefits and advantages will be apparent from the above as taken into conjunction with the accompanying examples, data, and all reasonable inferences to be drawn therefrom.

DETAILED DESCRIPTION OF CERTAIN EMBODIMENTS

The invention relates to a formulation for a cleaning composition (or simply a "cleaning composition") comprising at least one glycine, an alcohol, which in one exemplary embodiment is a diol and/or glycol, and a phospholipid complex. The cleaning composition of the invention can be used, for example, on personal care wet wipes such as baby wipes, facial wipes, moist toilet tissue, pet wipes, antibacterial wipes, hand-cleaning wipes and wipes for incontinence and feminine hygiene, as well as other types of cleaning wet wipes. As used herein, a "wipe" is a type of article suitable for cleansing or disinfecting or for applying a compound and/or removing materials and compounds from skin and surfaces, such as those disclosed in U.S. Pat. Nos. 7,101,612; 6,814,974; and 6,444,214, each of which is hereby expressly incorporated by reference in its entirety for all purposes. In one particular embodiment of the disclosure, this term refers to an article for cleansing the body, including the removal of bodily waste.

Preferably, the phospholipid complex is an organic phospholipid. Nonlimiting examples of organic phospholipids include alkyl PG-dimonium chloride phosphates with a fatty acid chain length between 8 and 20 carbons, such as, for example, cocamidopropyl PG-dimonium chloride phosphate. Other non-limiting examples of suitable alkyl PG-dimonium chloride phosphates include sodium coco PG-dimonium chloride phosphate, stearamidopropyl PG-dimonium chloride phosphate, myristalamidopropyl PG-dimonium chloride phosphate, sodium borageamidopropyl PG-dimonium chloride phosphate, linoleamidopropyl PG-dimonium chloride phosphate, linoleamidopropyl PG-dimonium chloride phosphate dimethicone, and the like.

Referring to cocamidopropyl PG-dimonium chloride phosphate, specifically, the complex belongs to a family of products that are multifunctional, natural triglyceride phospholipids and are similar to phospholipids that occur naturally in the body. Cocamidopropyl PG-dimonium chloride phosphate is a coconut oil derived phospholipid composed predominantly of diester and triester phosphatides with multiple-chain groups. It displays a broad range of functional attributes including gentle cleansing and foaming properties, anti-irritation effects when combined with anionic or nonionic surfactants, unusually high substantivity, long-lasting skin conditioning, and broad spectrum antimicrobial activity. Cocamidopropyl PG-dimonium chloride phosphates generally have the following formula:

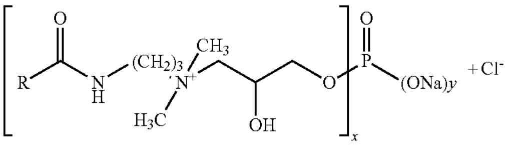

wherein the "R" group originates from coconut oil (i.e. $C_8$-$C_{20}$ alkyl) and "x"+"y" equals the integer 3.

As referred to herein, "glycine" is a compound having the following structure:

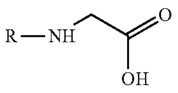

wherein the R group in one exemplary embodiment is $C_2$-$C_{20}$ alkyl, alkyne, or alkene, but in another exemplary embodiment is $C_8$-$C_{12}$ allyl, alkyne, or alkene. Further, the glycine available for use in the present disclosure is any glycine capable of providing antimicrobial effects to a composition including a diol and/or glycol, and a phospholipid complex and the glycine.

In certain exemplary embodiments, the glycine can be formed of one or more glycines, with particular glycines being selected from capryloyl glycine, a cosmetic conditioning agent having the following structure:

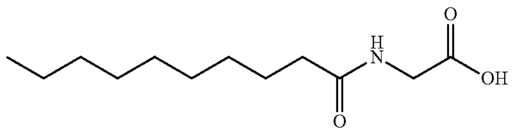 [SMILES: CCCCCCCCCC(=O)NCC(=O)O]

and/or undecylenoyl glycine, a deodorizing compound having the following structure:

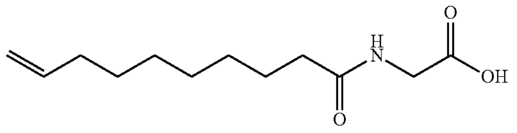 [SMILES: C=CCCCCCCCC(=O)NCC(=O)O]

and combinations thereof.

In other exemplary embodiments, the glycine may be present in its free or salt form, and it shall be understood that the terms "glycine" include within the scope thereof the free form of the compounds as well as their salts and/or complexes thereof as well as materials which are precursors to such compounds, salts and complexes which upon addition react to form such compounds, salts and complexes, unless otherwise specifically noted.

Another component of the preservative formulation is an alcohol, which can be a polyhydric alcohol that in one exemplary embodiment takes the form of a diol. In certain exemplary embodiments, one or more diols can be included in the composition, with each diol selected from diols having a primary chain length of $C_2$-$C_{20}$ in some exemplary embodiments, as well as diols having a primary chain length of $C_3$-$C_{12}$ in other exemplary embodiments, including a 1,2-diol, such as 1,2-hexanediol, which has the following structure:

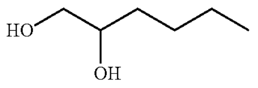

or, 1,5-pentanediol, which has the following structure:

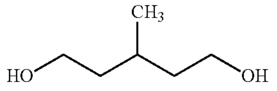

In addition to, or as a substitute for one or more of the polyhydric alcohols and/or diols, the composition can also include a glycol. While a number of different glycols can be utilized, in one exemplary embodiment the glycol is propylene glycol and has the following general structure:

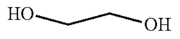

Other forms of a diol which can be useful in the compositions described herein include molecules derived from glycerin or other triols. Glycerin and other triols can be reacted with other molecules to create a diol such examples such as glyceryl monoethers, such as ethylhexylglycerin [3-(2-ethylhexyloxy)propane-1,2-doil] and or glyceryl monoesters, such as glyceryl monolaurate, and glyceryl monocaprylate.

It is to be understood that the formulation for the cleaning composition including the preservative composition can optionally include various other components or adjuncts. The glycine, one or more diols and/or glycols, alkyl PG-dimonium chloride phosphates and various other components are blended together to form a wet wipe cleaning composition, solution or emulsion that can be applied to a substrate to form a usable wet wipe that is sufficiently preserved for storage and consumer use.

The combination of the one or more glycines and one or more diols and/or glycols in combination with alkyl PG-dimonium chloride phosphates provide an enhanced performing preservative system that provides antimicrobial properties that are unexpected in light of the efficacy of the individual components for this purpose.

In certain particular exemplary embodiments of the wet wipe cleaning composition including the preservative composition of the present disclosure, the amount of glycine, e.g., the capryloyl glycine and/or undecylenoyl glycine, in the cleaning composition/solution ranges from about 0.01% to about 10.0% by weight and from about 0.01% to about 10.0% by weight for each glycine component that is present in the cleaning composition. In some particular exemplary embodiments, the ratio of the above mentioned glycines when present together in the composition is in a ratio of at least 5:1 of capryloyl glycine to undecylenoyl glycine, or more particularly 2:1, or even more particularly 1:1.

In another exemplary embodiment, the total amount of diol and/or glycol present in the wet wipe cleaning composition ranges from about 0.01% to about 10.0% by weight of the cleaning composition. In still another exemplary embodiment, the amount of organic phospholipid, e.g., the alkyl PG-dimonium chloride phosphate, in the wet wipe cleaning composition ranges from about 0.01% to about 2.0% by weight of the cleaning composition.

As stated above, the cleaning composition may optionally include and/or be used in combination with one or more additional components or adjuncts. The adjuncts include, but are not limited to, water, surfactants, emollients, fragrances and/or perfumes, botanical extracts, oils and/or lotions, silicones, waxes, dyes and/or colorants, solubilizing materials, stabilizers, thickeners, defoamers, hydrotropes, chelating agents, buffers, builders, enzymes, solvents, bleaching agents, cloud point modifiers, preservatives and/or combinations of the same. Any suitable solvent can be utilized with the preservative formulation and cleaning composition including the preservative formulation of the invention, but in certain exemplary embodiments the solvent is selected from $C_2$-$C_{20}$ but preferably $C_3$-$C_{12}$ diols, or from $C_2$-$C_{20}$ but preferably $C_3$-$C_{12}$ glycols/diols. Further, the diols and/or glycols utilized as the solvent can be the same as or different from those utilized in the preservative composition, such that in certain embodiments the preservative composition can function as the solvent.

In one exemplary embodiment of the present invention, the cleaning composition can be loaded onto an absorbent substrate. The absorbent substrate is preferably water-insoluble. By "water insoluble" is meant that the substrate does not dissolve but may readily break apart upon immersion in water. This cleaning composition can be used on flushable wipes in which the nonwoven substrate readily breaks apart after flushing. The water insoluble substrate is the implement or vehicle for delivering the cleaning composition of the present invention to the skin to be cleansed and moisturized. As used herein, the terms "substrate" or "wipe" are intended to include any material on which a cleaning composition may be loaded. In functional applications, a substrate is used to clean an article or a surface, as by wiping. Substrates comprise woven or non-woven materials, typically made from a plurality of fibers. The substrate can be used by itself (typically by hand) or attached to a cleaning implement, such as a floor mop, handle, or a handheld cleaning tool, such as a toilet cleaning device. A wide variety of materials can be used as the substrate. Nonlimiting examples of suitable water insoluble substrates include nonwoven substrates, woven substrates, sponges, cloths, meshes, paper towels, napkins, cleaning pads, and the like.

Preferred embodiments employ nonwoven substrates since they are economical and readily available in a variety of materials. By nonwoven is meant that the layer is comprised of fibers which are not woven into a fabric but rather are formed into a membrane, sheet, substrate, mat, absorbent core or pad layer or combinations thereof. Nonwoven substrates may be comprised of a variety of materials both natural and synthetic. By natural is meant that the materials are derived from plants, animals, insects or byproducts of plants, animals, and insects. By synthetic is meant that the materials are obtained primarily from various man-made materials or from natural materials which have been further altered. The conventional base starting material is usually a fibrous web comprising any of the common synthetic or natural textile-length fibers, or mixtures thereof. Non-limiting examples of natural materials useful in the present invention are silk fibers, keratin fibers and cellulosic fibers. Non-limiting examples of keratin fibers include those selected from the group consisting of wool fibers, camel hair fibers, and the like. Non-limiting examples of cellulosic fibers include those selected from the group consisting of wood pulp fibers, cotton fibers, hemp fibers, jute fibers, flax fibers, and mixtures thereof. Non-limiting examples of synthetic materials useful in the present invention include those selected from the group consisting of acetate fibers, acrylic fibers, cellulose ester fibers, modacrylic fibers, polyamide fibers, polyester fibers, polyolefin fibers, polyvinyl alcohol fibers, rayon fibers, polyurethane foam, and mixtures thereof. Examples of some of these synthetic materials include acrylics such as acrilan, creslan, and the acrylonitrile-based fiber, orlon; cellulose ester fibers such as cellulose acetate, arnel, and acele; polyamides such as nylons; polyesters such as fortrel, kodel, and the polyethylene terephthalate fiber, dacron; polyolefins such as polypropylene, polyethylene; polyvinyl acetate fibers; polyurethane foams and mixtures thereof. It is noted that the range of cleaning solution impregnated into the substrate includes from between 100% to 500% of the dry weight of the substrate.

Without being bound to any theory, the invention has shown that the glycines alone and/or with the diols provides a preservative booster to the preservative system containing a phospholipid complex (such as cocamidopropyl PG-dimonium chloride phosphate) which may have some limited preservation activity independently, depending on the level in the final formulation.

EXAMPLES

Table 1 shows multiple formulations for cleaning compositions to be loaded onto wet wipes, with Formulation A including components and amounts of the same that represent a specific working example of the inventive cleaning composition and preservative composition provided therein. The other Formulations B-D listed below are cleaning compositions including components of Formulation A, but omitting the preservative composition which were developed and tested separately to illustrate the synergistic, unexpected and non-obvious antimicrobial properties of the preservative composition and cleaning composition including the preservative composition.

TABLE 1

| Wet Wipe Cleaning Composition Formulations | | | | | | |
|---|---|---|---|---|---|---|
| Ingredient | % Use Level | % Active Level | Formulation A | Formulation B | Formulation C | Formulation D |
| Water | 95.3 | 100 | 95.835 | 99.3 | 98.3 | 99.428 |
| Cocamidopropyl PG Dimonium Phosphate | 1 | 46.5 | 0.465 | — | — | 0.372 |
| Capryloyl Glycine, Undecylenoyl Glycine | 0.5 | 100 | 0.5 | 0.5 | — | — |
| Monopropylene Glycol | 1.5 | 100 | 1.5 | — | — | — |
| 1,2-Hexanediol | 1.5 | 100 | 1.5 | — | 1.5 | — |
| Citric Acid | 0.1 | 100 | 0.1 | 0.1 | 0.1 | 0.1 |
| Sodium Citrate | 0.1 | 100 | 0.1 | 0.1 | 0.1 | 0.1 |

To illustrate the efficacy of the preservative composition and cleaning composition formed with the preservative composition of the present invention, a challenge test complying with USP/EP/BP methodologies was performed on the example Formulations A-D having the components listed in Table 1. More specifically, the testing performed on Formulations A-D of Table 1 to obtain the results shown in Table 2, was the PCPC M-5 test. Method for Preservation Test of Nonwovens Substrates Personal Care Products. In the test procedure, representative samples of each formulation were inoculated with separate mixed cultures of bacteria and fungi comprising of:

Inoculum A—Mixed Bacteria: *Pseud. aeruginosa* (ATCC 15442); *B. cepacia* (ATCC 25416); *E. coli* (ATCC 8739 or 11229); *S. aureus* (ATCC 6538).

Inoculum B—Mixed fungi: *A. brasiliensis* (ATCC 16404—*niger*); *C. albicans* (ATCC 10231); *Penicillium pinophilium* (ATCC 9644) or *Penicillium levitum* (ATCC 10464).

Table 2 shows the results from test and shows or indicates a log value of the number of viable organisms measured after the specified time interval from inoculation of the sample with the bacteria cultures. The term "TNTC" is an acronym for "Too Numerous To Count" and indicates the number of viable organisms has increased in comparison to the initial inoculum.

TABLE 2

| PCPC M-5 Test Results | | | | | | | |
|---|---|---|---|---|---|---|---|
| | | Initial (cfu/gram) | 24 hr (cfu/gram) | 72 hr (cfu/gram) | 7 Day (cfu/gram) | 14 day (cfu/gram) | Result Pass/Fail |
| Product A | Inoculum A | 1,700,000 | <10 | <10 | <10 | <10 | Pass |
| | Inoculum B | 350,000 | 18,000 | 7,500 | 650 | 1,250 | |
| Product B | Inoculum A | 1,700,000 | 1,900 | TNTC | TNTC | TNTC | Fail |
| | Inoculum B | 350,000 | 21,000 | TNTC | TNTC | TNTC | |
| Product C | Inoculum A | 1,700,000 | 48,000 | 6,150 | <10 | 750 | Fail |
| | Inoculum B | 350,000 | 53,000 | 24,000 | 9,800 | 36,000 | |
| Product D | Inoculum A | 1,900,000 | TNTC | TNTC | TNTC | TNTC | Fail |
| | Inoculum B | 340,000 | 3,900 | 350 | <10 | 5,650 | |

The results from Table 2 show that the composition according to the invention example Formulation A demonstrates the only acceptable log reduction for a personal care/cleaning product across both sets of inoculum (A & B) compared to the other Formulations B-D that were tested each including certain components of the preservative composition used in the cleaning composition of the present invention, but not all of the components, which all failed under USP/EP/BP testing criteria, illustrating the synergistic effects of the combination of the components forming the preservative composition of the wet wipe cleaning composition.

The disclosures of all articles and references, including patents, are incorporated herein by reference. The invention and the manner and process of making and using it are now described in such full, clear, concise and exact terms as to enable any person skilled in the art to which it pertains, to make and use the same. All references cited in this specification are incorporated herein by reference. It is to be understood that the foregoing describes preferred embodiments of the present invention and that modifications may be made therein without departing from the spirit or scope of the present invention.

What is claimed is:

1. A cleaning wipe comprising a substrate and a cleaning composition loaded onto the substrate, the cleaning composition comprising a preservative formulation consisting essentially of:

A) a combination of capryloyl glycine and undecylenoyl glycine present in an amount of from 0.5% to 10.0% by weight;

B) an alkyl PG-dimonium chloride phosphate; and

C) a diol or glycol selected from the group consisting of monopropylene glycol, 1,2-hexanediol, and 1,5-pentanediol.

2. A cleaning wipe according to claim 1 wherein the alkyl PG-dimonium chloride phosphate has a fatty acid chain length between 8 and 20 carbons.

3. A method of cleaning a surface, the method comprising the steps of:

a) providing a cleaning composition according to present claim 1;

b) applying the cleaning composition to a substrate to form a cleaning wipe; and c) applying the cleaning wipe to a surface.

4. A method according to claim 3, wherein the glycine comprises:

a) capryloyl glycine in an amount of from 0.1% to 10.0% by weight; and b) undecylenoyl glycine in an amount of from 0.1% to 10.0% by weight.

5. A method according to claim 3, wherein the glycine comprises a ratio of capryloyl glycine to undecylenoyl glycine of between 1:1 to 5:1.

6. The method according to claim 3, wherein the cleaning composition comprises:

A) the glycine combination in an amount of from 0.5% to 10.0% by weight;

B) the alkyl PG-dimonium chloride phosphate in an amount of about 0.01% to about 2.0% by weight; and C) the diol or glycol in an amount of about 0.1% to about 10.0% by weight; and D) water forming the balance by weight.

7. A cleaning wipe according to claim 1, wherein the glycine comprises:

a) capryloyl glycine in an amount of from 0.1% to 10.0% by weight; and b) undecylenoyl glycine in an amount of from 0.1% to 10.0% by weight.

* * * * *